United States Patent [19]
Jensen

[11] Patent Number: 5,947,529
[45] Date of Patent: Sep. 7, 1999

[54] CORE SPRAY LINE COUPLING APPARATUS

[75] Inventor: Grant C. Jensen, Morgan Hill, Calif.

[73] Assignee: General Electric Company, Schenectady, N.Y.

[21] Appl. No.: 09/093,272

[22] Filed: Jun. 8, 1998

[51] Int. Cl.⁶ ................................. F16L 21/00
[52] U.S. Cl. .................. 285/123.6; 285/15; 285/187; 285/332.1; 285/363; 376/282
[58] Field of Search .................. 376/282, 260; 285/332.1, 271, 123.9, 123.5, 123.6, 123.4, 15, 363, 187

[56] References Cited

U.S. PATENT DOCUMENTS

| | | | |
|---|---|---|---|
| 790,767 | 5/1905 | Walsh | 285/332.1 |
| 924,279 | 6/1909 | Seiffert | 285/271 X |
| 1,650,102 | 11/1927 | Tschappat | 285/123.6 |
| 2,031,654 | 2/1936 | Howard | 285/123.6 |
| 2,207,471 | 7/1940 | Yancey | 285/123.6 |
| 2,563,851 | 8/1951 | Lundeen et al. | 285/123.6 X |
| 4,647,084 | 3/1987 | Hagin et al. | 285/271 X |
| 5,737,380 | 4/1998 | Deaver et al. | 376/282 X |

*Primary Examiner*—Dave W. Arola
*Attorney, Agent, or Firm*—Armstrong Teasdale LLP

[57] ABSTRACT

Coupling apparatus for replacing a core spray line downcomer pipe coupled to a shroud T-box are described. In one embodiment, the coupling apparatus includes a seal ring, a mating flange, a housing having at least one wedge pocket, at least one coupling bolt, at least one wedge and at least one lateral pin. After extending the downcomer pipe into the housing, the seal ring is inserted into the opposite end of the housing adjacent the downcomer pipe. The seal ring is then seated on the mating flange seat. The two seats allow the downcomer pipe to be rotational misaligned with the coupling apparatus. The coupling bolts extend through the mating flange and the housing to rigidly secure the downcomer pipe to the coupling apparatus. Lateral pins extend through the housing and the downcomer pipe to provide vertical and torsional load transfer from the downcomer pipe to the coupling apparatus. Wedges are positioned in the wedge pockets and engage the downcomer pipe to provide resistance to a bending moment imposed on the coupling apparatus.

13 Claims, 3 Drawing Sheets

CORE SPRAY LINE COUPLING APPARATUS

FIELD OF THE INVENTION

This invention relates generally to nuclear reactors and more particularly, to apparatus and methods for coupling piping within reactor pressure vessels of such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spray spargers inside the RPV. The core spray piping and spargers deliver water flow to the reactor core.

Stress corrosion cracking (SCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Reactor internal piping, such as T-boxes and core spray line downcomers, occasionally require replacement as a result of SCC. Replacing the core spray piping often requires removing and replacing the core spray line downcomer. The core spray line downcomer attachment to the shroud core spray sparger T-box, however, typically is installed during original reactor construction and is difficult to access. In addition, replacing the core spray line downcomer is complicated by the limited available working space.

The core spray line downcomer includes a lower elbow secured to a shroud penetration thermal sleeve. Installing a replacement downcomer pipe, as originally designed, into the reactor requires that the replacement lower elbow be welded to the shroud. However, as explained above, it is difficult to access this area of the reactor.

It would be desirable to provide an apparatus which facilitates replacing a core spray line downcomer attached to the shroud core spray sparger T-box. It would also be desirable to provide such an apparatus which is installed without the necessity of field welding.

SUMMARY OF THE INVENTION

The present invention is directed to a coupling apparatus for connection of a replacement pipe section to the open end of a severed downcomer core spray pipe in a nuclear reactor. Coupling a replacement pipe to the downcomer pipe without field welding may be attained by a coupling apparatus which, in one embodiment, includes a ring shaped seal ring secured between a mating flange and a housing using four coupling bolts. The seal ring has a spherical convex seat. The mating flange includes a spherical concave seat for receiving the seal ring convex seat and a substantially cylindrical pipe opening. The housing includes a substantially cylindrical seal ring engaging portion for receiving a portion of the seal ring and a substantially cylindrical pipe opening having an inner diameter sized to receive the downcomer pipe. The housing also includes two lateral pin openings sized to receive lateral pins. The lateral pins extend through aligned respective housing lateral pin openings and into tapered lateral pin openings machined into the downcomer pipe. The seal ring seat seats on the mating flange and the four coupling bolts extend between and secure the mating flange to the housing. The convex and concave seats allow the downcomer pipe to be rotationally misaligned with the coupling apparatus. The housing also includes four wedge pockets which are equally spaced around the housing. Mating wedges are configured to be positioned in the wedge pockets and to form a tight fit between the housing and the outside surface of the downcomer pipe. The tight fit of the wedge between the housing and the downcomer pipe provides resistance to a bending moment imposed on the downcomer pipe coupling. Dowel pins extend through the housing and are configured to press fit into the housing to retain the wedges in place.

To install the coupling apparatus, a lower portion of the existing downcomer pipe is removed, for example, by cutting-off a portion of the downcomer pipe near the lower elbow and removing the lower elbow from the shroud. A replacement elbow with vertical pipe section is installed in the reactor. A method for replacing the lower elbow is described in copending patent application 09/015,429, filed Jan. 29, 1998, which is incorporated by reference in its entirety. The mating flange is coupled to the replacement vertical pipe section before attaching the elbow and vertical pipe section to the shroud. Two lateral pin openings are machined in the downcomer pipe.

After inserting the seal ring into the housing engaging portion, the downcomer pipe is extended into the housing until the downcomer pipe is adjacent to the seal ring. The seal ring convex seat is then seated on the mating flange concave seat, and the mating flange is coupled to the housing using the four coupling bolts. The downcomer pipe is then secured to the coupling apparatus using two lateral pins and the four mating wedges.

The above-described apparatus facilitates replacing a lower portion of a downcomer pipe without field welding. The coupling apparatus provides a strong leak free connection of the replacement vertical pipe to the downcomer pipe.

DETAILED DESCRIPTION

Figure 1:
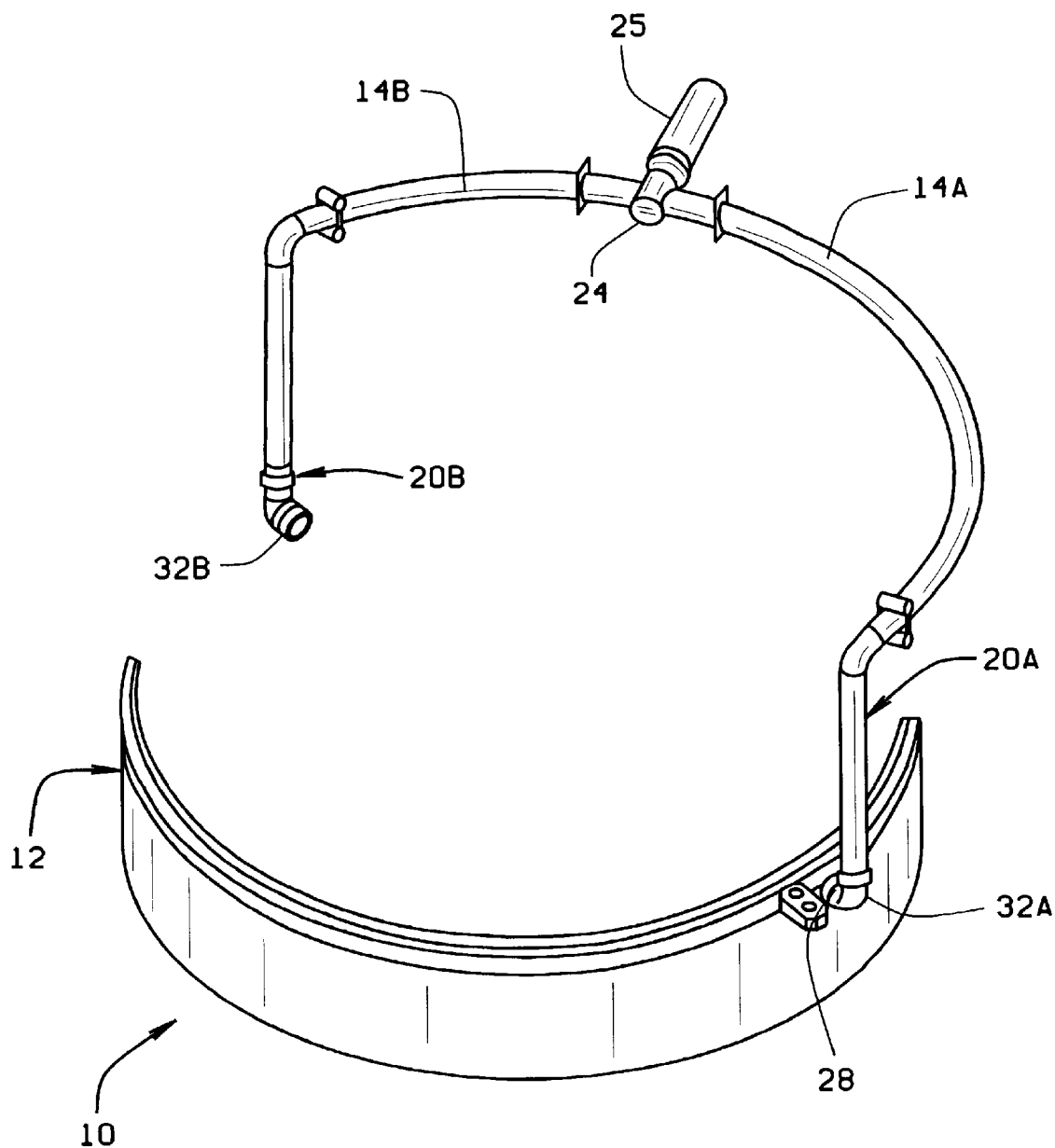
FIG. 1 is a perspective view with parts cut away of a portion of a reactor pressure vessel.

FIG. 1 is a perspective view with parts cut away of a portion of a reactor pressure vessel (RPV) 10. A shroud 12 surrounds the reactor core (not shown) of RPV 10. Cooling water is delivered to the reactor core during a loss of coolant accident through core spray laterals 14A and 14B which are connected to downcomer pipes 20A and 20B respectively. Line laterals 14A and 14B diverge from a T-box junction 24 which is connected to a core spray cooling water supply line 25. Downcomer pipe 20A is connected to shroud 12 through a T-box 28 which is attached to shroud 12 and an internal sparger (not shown). Downcomer pipes 20A and 20B include a lower elbow 32A and 32B. Lower elbows 32A and 32B are typically welded to shroud 12. Replacing downcomer pipes 20A and 20B is complicated because of the limited accessibility of lower elbows 32A and 32B. The limited accessibility makes welding of replacement downcomer pipes difficult.

Figure 3:
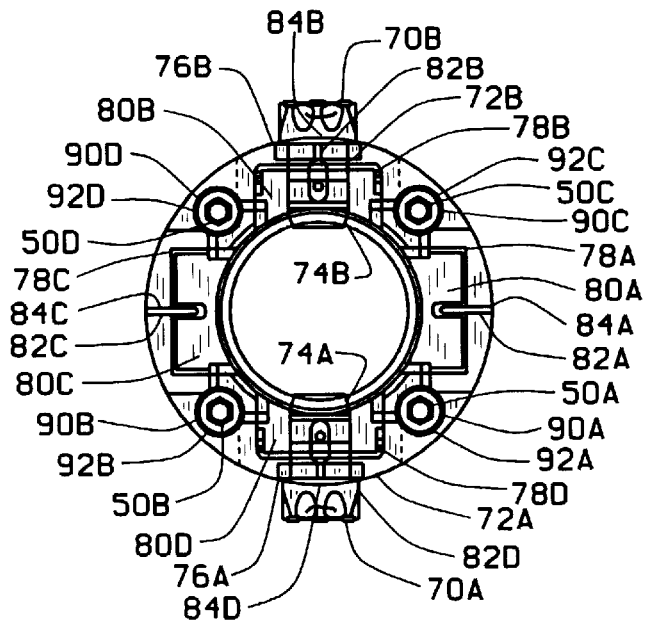
FIG. 3 is a top view with parts cut away of the housing shown in FIG. 2.
Figure 2:
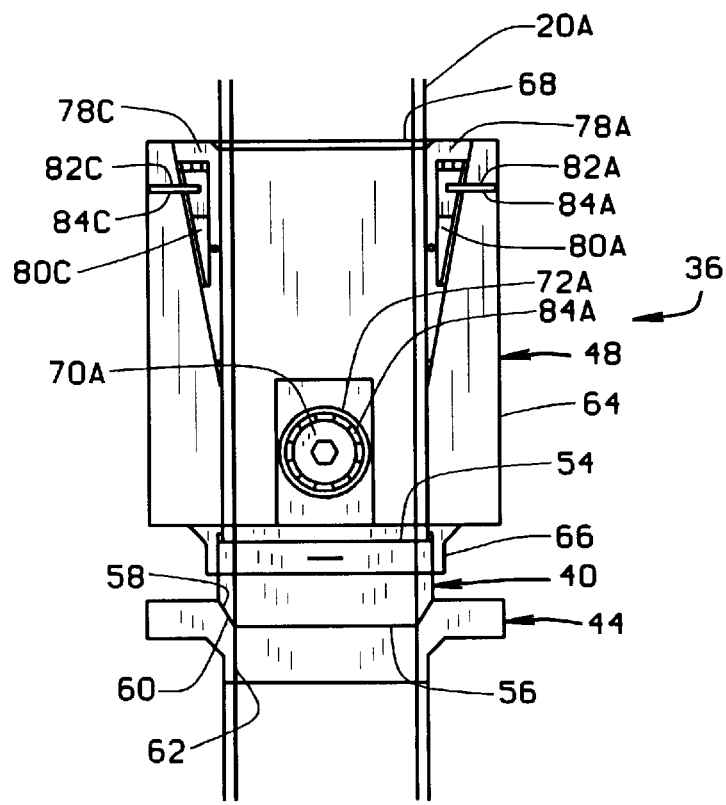
FIG. 2 is a front view with parts cut away of a coupling apparatus in accordance with one embodiment of the present invention.

Referring to FIGS. 2 and 3, a coupling apparatus 36 includes a ring shaped seal ring 40 secured between a mating flange 44 and a housing 48 using four coupling bolts 50A, 50B, 50C, and 50D. Seal ring 40 includes a first surface 54 and a second surface 56 having a spherical convex seat 58. Mating flange 44 includes a spherical concave seat 60, and a substantially cylindrical pipe opening 62. Spherical seat 60 is sized to receive seal ring seat 58 for accommodating misalignment of downcomer pipe 20A and mating flange 44.

Housing 48 includes a housing flange 64 and a substantially cylindrical seal ring engaging portion 66 extending from housing flange 64. Housing flange 64 also includes a substantially cylindrical pipe opening 68. The inner diameter of pipe opening 68 is sized to receive downcomer pipe 20A. Housing engaging portion 66 is sized to receive a portion of seal ring 40 so that seal ring seat 58 seats on mating flange seat 60 when mating flange 44 is coupled to housing 48. Two lateral pins 70A and 70B are sized to extend through aligned respective housing lateral pin openings 72A and 72B and tapered lateral pin openings 74A and 74B machined in downcomer pipe 20A. Lateral pins 70A and 70B equally distribute axial loading and are secured to housing 48 with respective crimp nuts 76A and 76B.

Housing 48 additionally includes wedge pockets 78A, 78B, 78C, and 78D, equally spaced about housing 48, and configured to position wedges 80A, 80B, 80C, and 80D adjacent downcomer pipe 20. Dowel pin openings 82A, 82B, 82C, and 82D extend through housing 48 and are configured to permit dowel pins 84A, 84B, 84C, and 84D to extend through housing 48 and engage wedges 80A, 80B, 80C, and 80D respectively to hold the wedges in place. Dowel pins 84A, 84B, 84C, and 84D are configured to have a press fit in openings 82A, 82B, 82C, and 82D.

Figure 4:
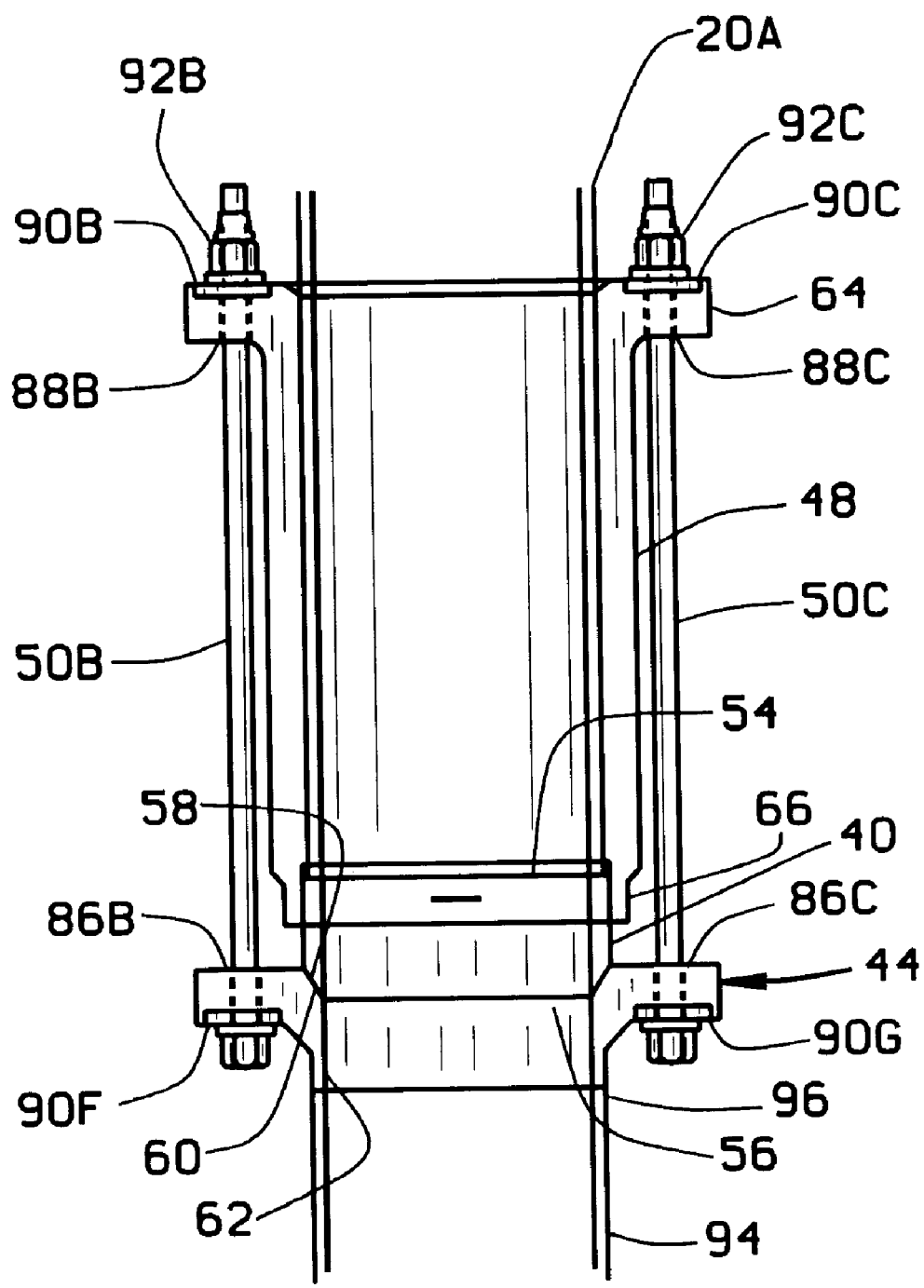
FIG. 4 is a side sectional view with parts cut away of the coupling apparatus shown in FIG. 2.

Referring to FIGS. 3 and 4, mating flange 44 includes four slotted coupling bolt openings 86A, 86B, 86C, and 86D sized to receive coupling bolts 50A, 50B, 50C, and 50D. Housing flange 64 includes four coupling bolt openings 88A, 88B, 88C, and 88D (only two shown) sized to receive coupling bolts 50A, 50B, 50C, and 50D.

Coupling bolts 50A, 50B, 50C, and 50D are sized to extend between mating flange 44 and housing 48 and each include two spherical washers 90A, 90B, 90C, 90D, 90E, 90F, 90G, and 90H (washers 90F and 90H not shown) and crimp nuts 92A, 92B, 92C, and 92D. Spherical washers 90A, 90B, 90C, 90D, 90E, 90F, 90G, and 90H provide a parallel surface for heads of coupling bolts 50A, 50B, 50C, and 50D and nuts 92A, 92B, 92C, and 92D. Coupling bolts 50A, 50B, 50C, and 50D share load and prevent eccentric loading.

Coupling bolts 50A, 50B, 50C, and 50D, and spherical washers 90A, 90B, 90C, 90D, 90E, 90F, 90G, and 90H may, for example, be fabricated from INCONEL X-750 for strength and to minimize the possibility of galling with crimp nuts 92A, 92B, 92C, and 92D. All other components of coupling apparatus 36, including seal ring 40, mating flange 44, housing 48, and crimp nuts 92A, 92B, 92C, and 92D may, for example, be fabricated from low carbon 316 stainless steel. In accordance with one embodiment of the present invention, coupling bolts 50A, 50B, 50C, and 50D are fabricated from a material, for example, INCONEL X-750, which has a lower thermal expansion coefficient than the type 316 stainless steel. As a result of the lower thermal expansion coefficient, tension of bolts 50A, 50B, 50C, and 50D is increased as the reactor heats up ensuring leak resistant joints.

Mating flange 44 is coupled to a replacement pipe section 94. Mating flange pipe opening 62 is configured to couple to an end 98 of pipe section 94.

In replacing the lower portion of downcomer pipe 20A, including lower elbow 32A, downcomer pipe 20A is cut-off between core spray line lateral 14A and lower elbow 32A. Lower elbow 32A is then removed from shroud T-box 28. Lower elbow with replacement pipe section 94 may be attached to shroud T-box 28 by such methods as, for example, described in copending U.S. patent application Ser. No. 09/015,429, filed Jan. 29, 1998. Replacement pipe section 94 is coupled to downcomer pipe 20A with coupling apparatus 36.

Downcomer pipe 20A is trimmed square and machined round, and tapered lateral pin openings 74A and 74B are formed in downcomer pipe 20A, typically by electrical discharge machining, near the end of downcomer pipe 20A to be coupled with coupling apparatus 36.

First mating flange 44 is coupled to replacement pipe section 94 at end 96 where pipe section 94 is to be coupled to downcomer pipe 20A. The coupling of mating flange 44 to pipe section 94 is typically done before elbow 32A and pipe section 94 is installed in T-box 28. Mating flange 44 may be coupled to replacement pipe section 94 by, for example, welding. Typically mating flange 44 is welded to pipe section 44 outside the reactor and prior to installing elbow 32A with replacement pipe 94 into T-box 28.

After inserting seal ring 40 into housing engaging portion 66, downcomer pipe 20A is inserted into housing 48 until adjacent to seal ring 40. Mating flange 44 is then positioned adjacent seal ring 40 so that seal ring seat 58 seats on spherical seat 60. After placing spherical washers 90E, 90F, 90G, and 90H over respective coupling bolts 50A, 50B, 50C, and 50D, coupling bolts 50A, 50B, 50C, and 50D are extended through mating flange coupling bolt openings 86A, 86B, 86C, and 86D and aligned housing coupling bolt openings 88A, 88B, 88C, and 88D. Slotted openings 86A, 86B, 86C, and 86D accommodate rotational misalignment between an axis of lateral pins 70A and 70B and a tangent point, or contact surface of shroud 12. Spherical washers 90A, 90B, 90C, and 90D are then placed over respective coupling bolts 50A, 50B, 50C, and 50D adjacent to housing 48 and crimp nuts 92A, 92B, 92C, and 92D are threadedly engaged to coupling bolts SOA, 50B, 50C, and 50D.

Lateral pins 70A and 70B are then extended through housing lateral pin openings 72A and 72B and aligned downcomer pipe lateral pin openings 74A 20 and 74B. As lateral pins 70A and 70B are torqued, pins 70A and 70B provide load transfer from downcomer pipe 20A to housing 48. The load path is through downcomer pipe 20A, lateral pins 70A and 70B into housing 48, into seal ring 40, into flange 44 and coupling bolts 50A, 50B, 50C, and 50D and back into housing 48. Lateral pins 70A and 70B are secured using crimp nuts 76A and 76B. Wedges 80A, 80B, 80C, and 80D are positioned in wedge pockets 78A, 78B, 78C, and 78D. Gravity causes wedges 80A, 80B, 80C, and 80D to move down into wedge pockets 78A, 78B, 78C, and 78D to form a tight fit between housing 48 and downcomer pipe 20A. Dowel pins 84A, 84B, 84C, and 84D are inserted into openings 82A, 82B, 82C, and 82D to ensure that wedges 80A, 80B, 80C, and 80D remain in the proper position during installation and reactor operation. Wedges 80A, 80B, 80C, and 80D provide resistance to a bending force moment imposed on coupling 36. Nuts 92A, 92B, 92C, and 92D are then torqued, clamping seal ring 40 between housing 48 and mating flange 44 forming a rigid joint between coupling apparatus 36 and downcomer pipe 20A.

The resulting connection provides a fluid passage from downcomer pipe 20A to T-box 28 while allowing rotational misalignment of downcomer pipe 20A and replacement pipe 94. Additionally, coupling apparatus 36 facilitates replacing downcomer pipe 20A without the necessity of welding inside the reactor.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. A coupling apparatus for coupling a downcomer pipe of a core spray line to a core shroud in a nuclear reactor, the downcomer pipe including at least one lateral pin opening, said apparatus comprising:

a seal ring having a first seat;

a mating flange having a second seat configured to receive said first seat of said seal ring; and a housing for securing said first seat on said second seat, said housing comprising at least one wedge pocket configured to position a wedge adjacent the downcomer pipe, at least one lateral pin opening configured to substantially align with the downcomer pipe lateral pin opening, and an engaging portion for receiving said seal ring, said seal ring positioned between said mating flange and said engaging portion of said housing, said housing further comprising a lateral pin extending through said lateral pin opening and configured to engage the downcommer pipe lateral pin opening.

2. A coupling apparatus in accordance with claim 1 wherein said housing and said mating flange each have at least one coupling bolt opening, and wherein said apparatus further comprises at least one coupling bolt extending through said coupling bolt openings.

3. A coupling apparatus in accordance with claim 2 wherein said mating flange bolt opening is slotted.

4. A coupling apparatus in accordance with claim 2 further comprising at least one spherical washer coupled to said coupling bolt.

5. A coupling apparatus in accordance with claim 2 wherein thermal expansion coefficient of said coupling bolt is lower than thermal expansion coefficient of said seal ring, mating flange, and housing.

6. A coupling apparatus in accordance with claim 1 wherein said first seat is a spherical convex seat and said second seat is a spherical concave seat.

7. A coupling apparatus in accordance with claim 1 further comprising at least one wedge positioned in said wedge pocket and configured to contact the downcomer pipe.

8. A coupling apparatus in accordance with claim 7 wherein said housing comprises at least one dowel pin opening extending through said housing to said wedge pocket, and said coupling apparatus further comprises at least one dowel pin extending through said dowel pin opening to retain said wedge in proper position.

9. A coupling apparatus for coupling a downcomer pipe of a core spray line to a core shroud in a nuclear reactor, the downcomer pipe including at least one lateral pin opening, said apparatus comprising:

a seal ring having a first seat;

a mating flange comprising a second seat configured to receive said first seat, and four coupling bolt openings; and a housing for securing said first seat on said second seat, said housing comprising four wedges, four wedge pockets configured to position said wedges adjacent the downcomer pipe, four coupling bolt openings substantially aligned with said mating flange coupling bolt openings, four coupling bolts extending through said aligned coupling bolt openings, and two lateral pin openings configured to substantially align with the downcomer pipe lateral pin openings, and lateral pins extending through said lateral pin openings in said housing and configured to engage said lateral pin openings in said downcomer pipe said seal ring positioned between said housing and said mating flange.

10. A coupling apparatus in accordance with claim 9 wherein said housing further comprises four dowel pin openings, each dowel pin opening extending through said housing to a corresponding wedge pocket, and said coupling apparatus further comprises four dowel pins, each said dowel pin extending through said dowel pin openings to retain said corresponding wedges in proper position.

11. A coupling apparatus in accordance with claim 9 wherein said mating flange bolt openings are slotted.

12. A coupling apparatus in accordance with claim 9 wherein thermal expansion coefficient of said coupling bolts are lower than thermal expansion coefficient of said seal ring, mating flange, and housing.

13. A coupling apparatus in accordance with claim 9 wherein said first seat is a spherical convex seat and said second seat is a spherical concave seat.

* * * * *